United States Patent [19]

Kogler et al.

[11] 4,162,104
[45] Jul. 24, 1979

[54] CUTTING MACHINE

[75] Inventors: Peter Kogler, Knittelfeld; Alfred J. Zitz, Zeltweg, both of Austria

[73] Assignee: Vereinigte Osterreichische Eisen- und Stahlwerke-Alpine Montan Aktiengesellschaft, Vienna, Austria

[21] Appl. No.: 799,937

[22] Filed: May 24, 1977

[30] Foreign Application Priority Data

May 25, 1976 [AT] Austria ................................. 3837/76

[51] Int. Cl.² .............................................. E21C 27/24
[52] U.S. Cl. ........................................ 299/75; 299/89; 184/6.22
[58] Field of Search ........................ 299/75, 80, 89, 90; 74/467, 468; 123/196 AB, 41.33; 184/6.22; 310/64; 175/17

[56] References Cited

U.S. PATENT DOCUMENTS

| 2,075,521 | 3/1937 | Hild | 123/41.33 X |
|---|---|---|---|
| 2,355,342 | 8/1944 | Van Wormer | 175/17 |
| 2,435,041 | 1/1948 | Hild | 123/41.33 X |
| 2,920,879 | 1/1960 | Drehaus | 299/87 X |
| 3,362,753 | 1/1968 | Sibley | 175/17 X |
| 4,047,763 | 9/1977 | Gilliland et al. | 299/89 X |

FOREIGN PATENT DOCUMENTS

| 152165 | 11/1950 | Australia | 299/75 |
|---|---|---|---|
| 2332472 | 1/1974 | Fed. Rep. of Germany | 299/75 |

Primary Examiner—Ernest R. Purser
Assistant Examiner—Nick A. Nichols, Jr.
Attorney, Agent, or Firm—Cushman, Darby & Cushman

[57] ABSTRACT

A cutting machine having a universally movable cutting arm provided with a plurality of cutting heads in which the cutting machine's oil reservoir is mounted within the cutting arm and cooled by the water cooling system for the cutting machine's motor. The cutting heads and the reduction gearing drive therefor employ a common reservoir which is connected to and supplied by the cutting machine's main oil reservoir so that the cutting heads and associated drive gearing are continuously being supplied with cooled oil and are themselves cooled thereby.

6 Claims, 3 Drawing Figures

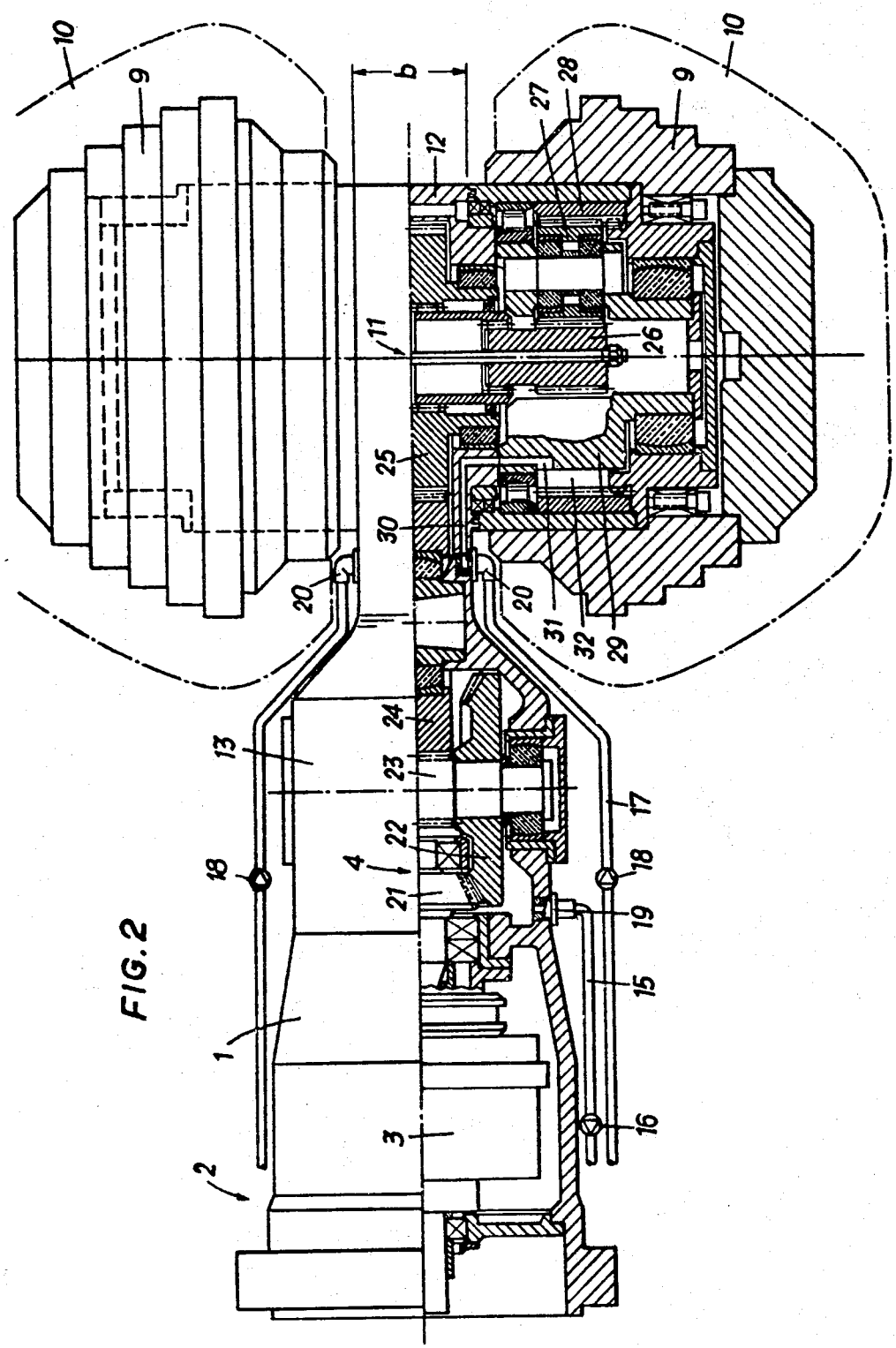

CUTTING MACHINE

The parent patent concerns a cutting machine, namely a so-called partial-cut cutting machine, in which at both sides of the end of a cutting arm which can be swiveled in all directions, one cutting head each is hinged on an axis which is located vertically to the longitudinal position of the arm. This cutting head, by the swiveling of the cutting arm makes a forward movement in the direction of its axis, in which case the cutting heads are driven over a reduction gear by a driving means located in the cutting arm. The object of the parent patent is a means in the case of which at least the last stage of the reduction gear is disposed within the hollow cutting heads. Such a construction, according to the parent patent, has the advantage that the width of the end of the cutting arm and thus the distance between the cutting heads as compared to the customary constructions of this type is considerable reduced. At the start of the cutting work, the cutting arm with the cutting heads is pushed forward to the mining face, in which case between the two cutting heads, one "rib" remains in the rocks of the mining face. Because of the fact that the distance between the cutting heads is reduced, there is a smaller width of the rib and this more narrow rib can now be broken or cut with less work. The removal of a wider rib is difficult especially in the case of high cubic pressure strengths of the rock. The fact that a more narrow rib is formed makes it therefore possible to cut rock with very high cubic pressure strength, for example, up to 1,500 kp/cm$^2$. The cutting heads must exhibit a high cutting performance and this results in a heating of the cutting heads. This heating is the higher, the higher the cubic pressure strength. Thus, the gear wheels located within the cutting heads are heated to high temperatures, and since these gear wheels operate in oil, the oil filling of the gear housing is also heated considerably. This therefore has a considerable effect on the lubrication of the gear wheels.

The present invention aims at eliminating this disadvantage and essentially consists of the fact that at least one oil supply line or oil discharge line is connected to the housing of the reduction gear in the proximity of the cutting heads, and at least one oil discharge line or oil supply line is connected at a distance from the cutting heads. These lines or pipes open out into an oil tank disposed in or at the cutting arm at a point between the cutting motor and the cutting machine. In this case, a pump is connected to the oil supply and/or oil discharge line. In this manner, the oil supply used for the lubrication is significantly increased in regard to the receiving volume of the gear housing and this larger oil supply is therefore subjected to less heating or cooled in the oil tank, so that the lubrication is improved. In order to improve this cooling, the oil tank is, according to the invention, preferably cooled by the cooling water of the cutting motor, in which case it is practical to connect a cooling coil disposed in the oil tank into the cooling water return pipe from the water recooler to the cutting motor. The cooling not only avoids the heating of the oil supply by the hot cutting heads, but the cutting heads themselves are also cooled because of the cooled oil.

According to the preferred construction of the invention, the arrangement is carried out in such a way that the pipes which are connected to the housing in the vicinity of the cutting heads open out into canals, which themselves open out into hollow spaces which are connected to that end of the housing of the reduction gear which faces the cutting motor, within each one of the two hollow cutting heads. The other line, in each case, namely the oil discharge line or oil supply line is connected to the end of the reduction gear which faces the cutting motor. This insures a forced circulation of the oil through those parts of the reduction gear which are especially subjected to the heating by the cutting heads, and the cutting heads are cooled in an effective manner.

In the case of an arrangement in which that end of the cutting arm which is pivoted at the cutting machine is widened in the shape of a fork, the oil container is, according to the invention preferably housed within this fork-shaped widening, since there is a sufficient amount of space for the relatively large oil tank.

In the drawing, the invention is explained by means of an example of the construction.

FIG. 2 shows one part of the cutting arm which houses the reduction gear, with the cutting heads, partially as a horizontal section through the axis of the cutting arm.

FIG. 3 is a diagrammatic elevational view of the separate oil supply tank with parts cut away for clarity.

Figure 1:
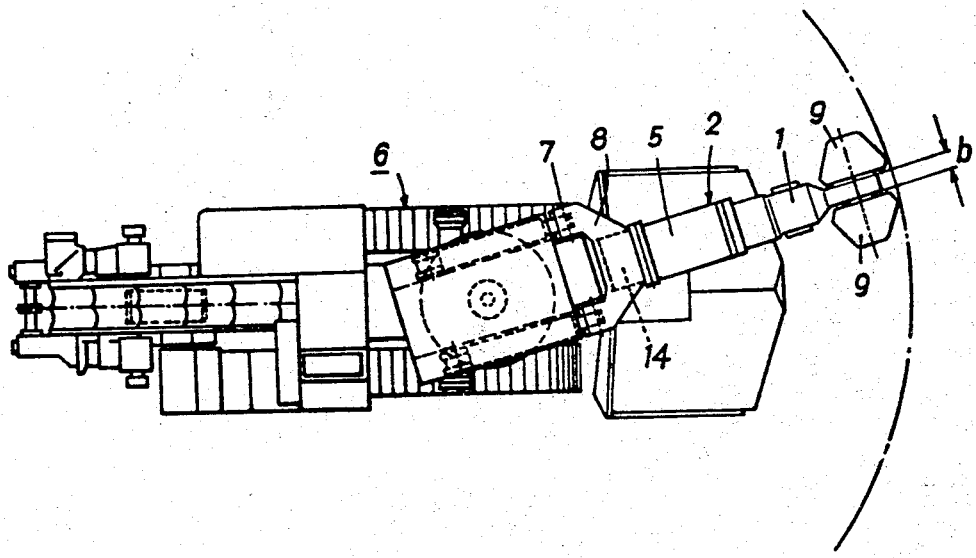
FIG. 1 shows an elevational view on the cutting maching with the cutting arm.

A variable gear 3 and the reduction gear 4 are housed in the front part 1 of the cutting arm 2. The cutting motor is housed in the center part 5. The end of this cutting arm 2 which is pivoted to the cutting machine 6 so that it can be swiveled around an axis 7, has a fork-shaped widening 8, 9 are the two cutting heads which are equipped with chisels, in which case the dash-dotted line 10 is the envelope of the chisel blades. The last phase 11 of the reduction gear is housed within the two hollow cutting heads. Therefore, the part 12 of the housing 13 of the reduction gear 4 located between the two cutting heads may be narrow, in which case the width of this part of the housing is called b.

In the fork-shaped widening 8 of the cutting arm 2, the oil tank 14 is located. A cooling coil which is not shown is disposed in this oil tank through which passes the cooling water of the motor, in which case this cooling coil is best connected into the cooling water return pipe from the water cooler to the cutting motor, so that cooled water is available. A pipe 15 is connected to the housing 13 of the reduction gear at 19, over which the oil is drawn off from housing 13 by means of a pump 16 and is transported to the oil tank 14. From the oil tank 14, the cooled oil is over a pipe 17 to which a pump 18 may be connected, sent back to the housing 13 of the reduction gear 4. The connection of this pipe 17 to the housing 13 of the reduction gear is called 20.

The drive of the cutting heads is carried out by the variable gear 3 over two bevel gears 21, 22 and a pinion 23 secured by wedge on the shaft of the bevel gear 22. A spur gear 24 meshes with the pinion 23, and a spur gear 25 meshes with the spur gear 24. Planetary wheel gears are driven by the spur gear 25. These planetary wheel gears are located in the two cutting heads 9. The sun wheels 26 of these planetary wheel gears are disposed to have the same axis as the spur gear 25 and are driven by the spur gear 25. Over planetary wheels 27, the hollow wheels 28 which are firmly connected with the hollow cutting heads 9, are driven. The planetary wheels 27 are located in a support 29 which is bolted with the housing 13 of the reduction gear 4.

From the connection 20, the cooled oil transported over the pipe 17, is over a canal 30 which is provided in the housing 13, transported to a groove 31. Therefore the oil flows out into a hollow space 32, so that the parts of the reduction gear 4 which are located in the two cutting heads (last phase 11), which are located within the cutting heads 9, are cooled intensively.

For reasons of clarity, the pumps 16 and 18 are in FIG. 2 drawn outside the cutting arm 2, however, they are arranged at the oil tank 14. For the same reason, the two pipes 17 are shown at both sides of the cutting arm 2, but are for practical reasons carried at the upper side of the cutting arm, in order to avoid damages. The connection 19 of the pipe 15 is best disposed at the bottom side of the housing of the reduction gear 4.

We claim:

1. In a mine cutting machine which includes a hollow cutting arm that can be swiveled in all directions with the cutting arm being provided with hollow cutting heads on each side of the end thereof, each cutting head being hinged around an axis which is located vertically to the longitudinal position of the cutting arm, in which by the swiveling of the cutting arm the cutting heads are moved across the mine face and driven by reduction gearing drive means located in the hollowed portion of said cutting arm and wherein at least the last phase of the reduction gearing drive means is disposed within the hollowed portion of said cutting heads, the improvement comprising having at least a portion of the reduction gear housing within the cutting axis in communication with the hollowed portion of the cutting heads providing a separate oil supply tank on the cutting arm at a point between the cutting motor and the cutting machine for holding a separate supply of oil, connecting at least one oil supply line between said oil supply tank and the housing of the reduction gearing drive means adjacent said cutting heads, providing at least one oil discharge line between said oil supply tank and the housing of said reduction gearing drive means at a distance from said cutting heads, pump means for circulating oil from said oil supply tank through said at least one oil supply line and said at least one oil discharge line so that a flow of oil is established from said oil supply tank through said at least one oil supply line through at least portion of the reduction gear housing over the last phase of the reduction gear drive means within said cutting heads and back to said oil supply tank through said at least one oil discharge line, and cooling means for cooling oil held in said oil supply tank wherein each of said cutting heads includes means defining hollow spaces located therein and wherein said at least one oil supply line discharges cooled oil into said hollow spaces within said cutting heads and wherein said at least one oil discharge line is connected to that portion of the reduction gear housing closest to said cutting motor.

2. The cutting machine as in claim 1 wherein said cooling means includes a cooling coil positioned within said oil supply and connected to the water cooling system for the cutting motor so that the oil within said oil supply is cooled by the cooling water of the cutting motor.

3. A cutting machine as in claim 1 wherein said cutting arm is provided with a fork-shaped widened area adjacent the point the cutting arm is attached to said cutting machine, said oil tank being positioned within said fork-shaped widened area of said cutting arm.

4. In a cutting machine having a hollow cutting arm able to be swiveled in all directions, the end of the cutting arm being provided with a plurality of hollow cutting heads, each cutting head being hinged around an axis which is located vertically to the longitudinal position of the cutting arm, in which by the swiveling of the cutting arm the cutting heads are moved across the mine face with the cutting heads being driven by reduction gearing drive means located in the hollowed portion of said cutting arm and wherein at least the last phase of the reduction gearing drive means is disposed within the housing defined by the hollowed portion of said cutting heads, the improvement comprising having at least a portion of the reduction gear housing within the cutting arm in communication with the housing defined by the hollow portion of the cutting heads providing an oil supply for the cutting machine on the cutting arm at a point between the cutting motor and the cutting machine, connecting at least one oil supply line between said oil supply and the housing of the reduction gearing drive means at a distance from said cutting heads, providing at least one oil discharge line between said oil supply and the housing of said reduction gearing drive means adjacent said cutting heads, pump means for circulating oil from said oil supply through said at least one oil supply line and said at least one oil discharge line so that a flow of oil is established from said oil supply through said at least one oil supply line through at least a portion of the reduction gear housing on the cutting arm, the hollow portion of the cutting heads and back to said oil supply through said at least one oil discharge line, and cooling means for cooling oil held in said oil supply.

5. A cutting machine comprised of: a main movable support having a universally movable hollow cutting arm mounted thereon, said cutting arm having one end mounted to said cutting machine, a plurality of hollow gear driven cutting heads mounted at the opposite end of said cutting arm, the gear driven cutting heads being drivingly connected to a cutting motor through reduction gearing mounted within the hollow portion of said cutting arm, a common oil supply for the hollow gear driven cutting heads and at least a portion of the reduction gearing located within the cutting arm, and where the cutting motor is provided with a water cooling system said machine further including a separate oil supply tank on the cutting arm connecting at least one oil supply line between the separate oil supply and the reduction gearing housing, providing at least one oil discharge line between the reduction gearing housing and the separate oil supply, pump means for circulating oil from the separate oil supply through said at least one oil supply line and said at least one oil discharge line so that a flow of oil is established from the separate oil supply through said at least one oil supply line the reduction gearing and cutting and hollow gearing driven cutting heads and back to the separate oil supply through said at least one oil discharge line, and cooling means for cooling oil held in the separate oil supply.

6. Apparatus for cooling the cutting heads of a cutting machine, said cutting heads being mounted to the end of a hollow cutting arm movably mounted on said cutting machine including reduction gearing located within a housing positioned in the hollow cutting arm with a last reduction phase of said gearing being positioned in a hollow space within the cutting heads, said cooling apparatus comprising oil lines for supplying and discharging oil, an oil tank mounted on said cutting arm and connected to one end of said lines and an oil pump interposed in one of said lines, wherein the other end of one line is connected to one end of the housing of the reduction gearing adjacent said cutting heads and that said line opens into the hollow spaces arranged within each of the two hollow cutting heads, and wherein the other end of the other oil line is connected to the other end of the housing of the reduction gearing at a point spaced away from said cutting heads.

* * * * *